(12) United States Patent
Kim

(10) Patent No.: US 8,958,745 B2
(45) Date of Patent: Feb. 17, 2015

(54) ELECTRONIC DEVICE AND OPERATING METHOD THEREOF

(75) Inventor: Sunryang Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 241 days.

(21) Appl. No.: 13/231,437

(22) Filed: Sep. 13, 2011

(65) Prior Publication Data

US 2012/0329390 A1    Dec. 27, 2012

Related U.S. Application Data

(60) Provisional application No. 61/499,584, filed on Jun. 21, 2011.

(51) Int. Cl.
*H04B 5/00* (2006.01)
*H04B 7/00* (2006.01)
*H04M 1/00* (2006.01)
*G09G 5/377* (2006.01)
*H04W 4/00* (2009.01)

(52) U.S. Cl.
CPC .................................... *H04W 4/008* (2013.01)
USPC ...... 455/41.1; 345/629; 455/552.1; 455/41.2; 455/575.2

(58) Field of Classification Search
USPC ................................................ 455/41.1, 41.2
See application file for complete search history.

(56) References Cited

U.S. PATENT DOCUMENTS

| | | | | |
|---|---|---|---|---|
| 7,107,009 | B2 * | 9/2006 | Sairanen et al. | 455/41.1 |
| 7,349,698 | B2 * | 3/2008 | Gallagher et al. | 455/435.2 |
| 7,487,112 | B2 * | 2/2009 | Barnes, Jr. | 705/26.8 |
| 7,756,467 | B2 * | 7/2010 | Bent et al. | 455/3.04 |
| 7,907,896 | B2 * | 3/2011 | Chitti | 455/41.1 |
| 7,970,350 | B2 * | 6/2011 | Sheynman et al. | 455/41.1 |
| 8,224,246 | B2 * | 7/2012 | Suumaki et al. | 455/41.1 |
| 8,244,181 | B2 * | 8/2012 | Shuo | 455/41.2 |
| 2004/0104864 | A1 * | 6/2004 | Nakada | 345/8 |
| 2007/0021205 | A1 * | 1/2007 | Filer et al. | 463/36 |
| 2008/0114476 | A1 * | 5/2008 | Kay et al. | 700/90 |
| 2009/0227282 | A1 * | 9/2009 | Miyabayashi et al. | 455/552.1 |
| 2009/0247077 | A1 * | 10/2009 | Sklovsky et al. | 455/41.1 |
| 2010/0064228 | A1 * | 3/2010 | Tsern | 715/740 |
| 2010/0081377 | A1 * | 4/2010 | Chatterjee et al. | 455/41.1 |
| 2011/0175930 | A1 * | 7/2011 | Hwang et al. | 345/629 |
| 2011/0217960 | A1 * | 9/2011 | Tanaka et al. | 455/414.1 |
| 2011/0237195 | A1 * | 9/2011 | Griffin et al. | 455/41.3 |
| 2012/0042087 | A1 * | 2/2012 | Berg et al. | 709/229 |
| 2012/0045990 | A1 * | 2/2012 | Sandell | 455/41.2 |
| 2012/0069199 | A1 * | 3/2012 | Chang et al. | 348/207.1 |
| 2012/0110568 | A1 * | 5/2012 | Abel et al. | 717/178 |
| 2012/0238214 | A1 * | 9/2012 | Somalingam et al. | 455/41.3 |

* cited by examiner

*Primary Examiner* — Edward Urban
*Assistant Examiner* — Ralph H Justus
(74) *Attorney, Agent, or Firm* — Birch, Stewart, Kolasch & Birch, LLP

(57) ABSTRACT

A near field communication (NFC) device and corresponding operating method are described. The method according to an embodiment includes establishing a NFC link with a different electronic device, which is executing a first application, through an NFC module of the electronic device; obtaining information related to the first application through the NFC link; and executing a second application related to the first application based on the obtained information.

17 Claims, 15 Drawing Sheets

(a)

(b)

Figure 4
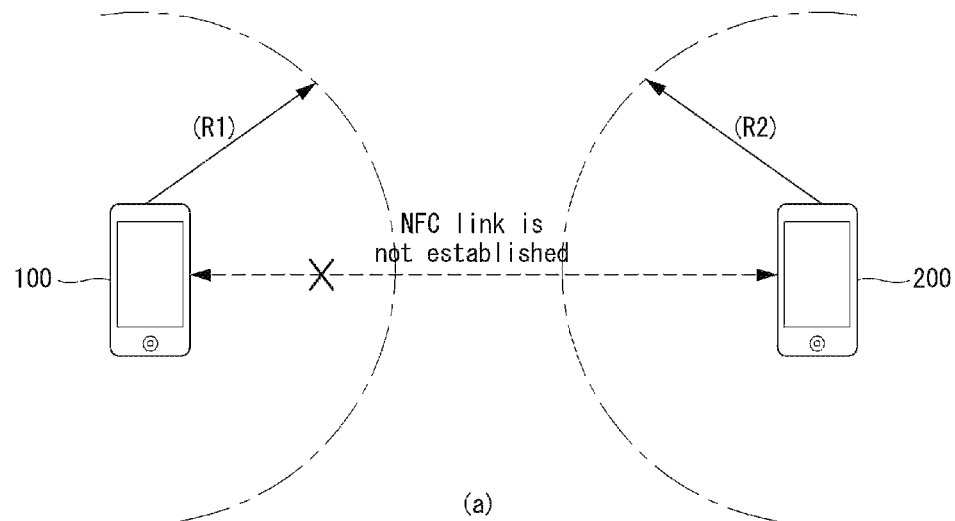
(a)
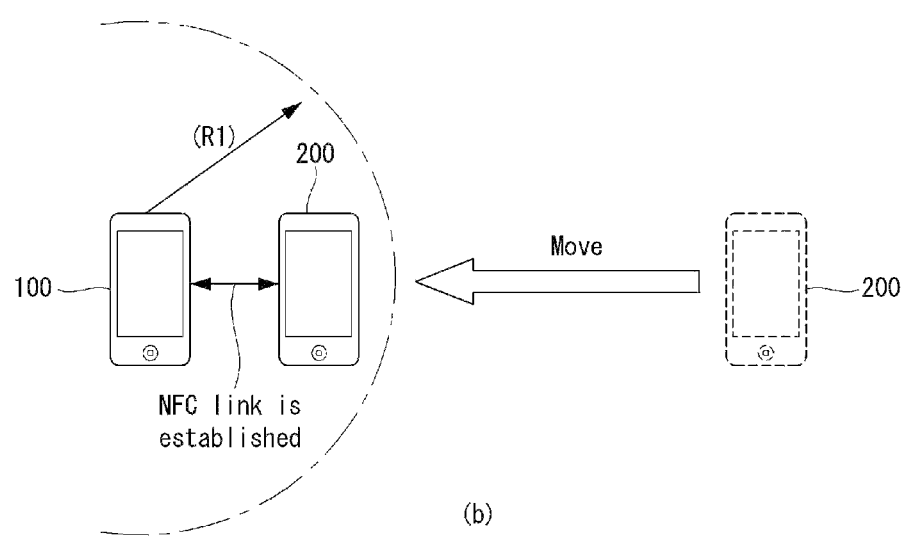
(b)

Figure 14
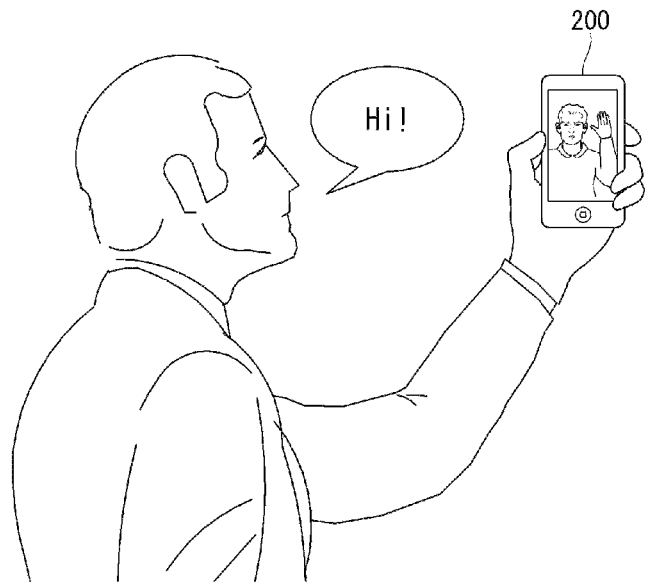
(a)
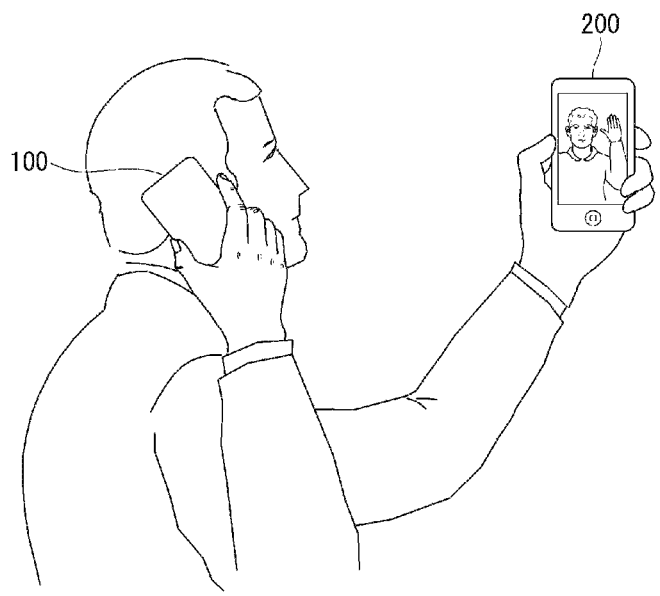
(b)

ELECTRONIC DEVICE AND OPERATING METHOD THEREOF

CROSS REFERENCE TO RELATED APPLICATIONS

This Application is related to, and claims priority to, U.S. Provisional Patent Application 61/499,584, filed on Jun. 21, 2011, the entire contents of which being incorporated herein by reference.

BACKGROUND OF THE INVENTION

1. Field of the Invention

The present invention relates to near field communication and, more particularly, to an electronic device capable of recognizing an application desired to be performed by a user through near-field communication and performing the application, thus increasing user convenience, and an operating method thereof.

2. Discussion of the Background Art

Near field communication (NFC) is a very short-range contactless data transfer technology related to radio frequency identification (RFID), and may be used for communication between devices located within 10 centimeters (preferably, 4 centimeters) from each other.

NFC typically uses a center frequency of 13.56 MHz and is able to provide a transfer rate of 106 kbps, 212 kbps, or 424 kbps. NFC may have compatibility with a variety of contactless communication protocols. For example, NFC may be compatible with protocols defined by ISO 14443 type A, B, F, ISO 18092.

NFC may be applied to various fields, for example, onto an implementation of a home network, a smart poster, bus ticketing, or the like.

Recently, a variety of services using NFC has arisen. Accordingly, improvements to NFC functionality are desirable.

SUMMARY OF THE INVENTION

One embodiment of the present invention provides an electronic device that executes a function related to a particular function of a different electronic device when a near field communication (NFC) link is established in a state in which the particular function is executed in the different electronic device, and a method for operating an electronic device.

Another embodiment of the present invention is to provide an electronic device that executes an application related to a particular function performed in a different electronic device when a near field communication (NFC) link is established in a state in which the particular function is executed in the different electronic device, and a method for operating an electronic device.

The present invention is not limited to the foregoing technical subjects and any other technical subjects not mentioned will be clearly understood by a skilled person in the art to which the present invention pertains from the following description.

According to a first embodiment of the present invention, there is an electronic device that includes: a near field communication (NFC) module; and a controller configured to obtain information related to a first application through an NFC link when the NFC link is established with a different electronic device, which is executing the first application, through the NFC module, and execute a second application related to the first application.

According to a second embodiment of the present invention, there is an electronic device that includes; an NFC module; and a controller configured to transmit a control signal through an NFC link to allow a different electronic device to execute a second application related to a first application when the NFC link is established with the different electronic device through the NFC module, while the electronic device is executing the first application.

According to a third embodiment of the present invention, there is a method for operating an electronic device that includes; establishing a near field communication (NFC) link with a different electronic device, which is executing a first application, through an NFC module; obtaining information related to the first application through the established NFC link; and executing a second application related to the first application based on the information related to the first application.

According to a fourth embodiment of the present invention, there is a method for operating an electronic device that includes; executing a first application; and when an NFC field is established with a different electronic device through an NFC module while the first application is being executed, transmitting a control signal through the NFC link to allow the different electronic device to execute a second application related to the first application.

According to another embodiment of the invention, there are a near field communication (NFC) device and corresponding operating method. The method includes establishing a NFC link with a different electronic device, which is executing a first application, through an NFC module of the electronic device; obtaining information related to the first application through the NFC link; and executing a second application related to the first application based on the obtained information.

According to another embodiment, there are a NFC device and corresponding operating method for exchanging information, via an NFC link, with a different electronic device. The method includes executing a first application; and transmitting a control signal through the NFC link to allow the different electronic device to execute a second application related to the first application when the NFC link is established and while the electronic device is executing the first application.

In the electronic devices and methods of the various embodiments of the present invention, when an NFC link is established with a different electronic device which is performing a particular function, the electronic device automatically performs an application related to the particular function, thus providing the application fitting a user intention among a variety of applications.

In the electronic devices and methods of the various embodiments of the present invention, when an NFC link is established with a different electronic device while the electronic device is performing a particular function, an application related to the particular function is executed in the different electronic device, thus providing an application fitting a user intention.

The effects of the present invention are not limited to the foregoing effects and any other effects not mentioned will be clearly understood by a skilled person in the art to which the present invention pertains from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a view for explaining near field communication (NFC) according to an embodiment of the present invention.

FIG. 14 is a view for explaining a specific example of the method for operating an electronic device according to an embodiment of the present invention.

DETAILED DESCRIPTION OF THE PREFERRED EMBODIMENTS

The foregoing and other objects, features, aspects and advantages of the present invention will become more apparent from the following detailed description of the embodiments of the present invention when taken in conjunction with the accompanying drawings. The present invention may be embodied in many different forms and may have various embodiments, of which particular ones will be illustrated in drawings and will be described in detail. Throughout the specification, like numbers refer to like elements throughout. In describing the embodiments of the present invention, if a detailed explanation for a related known function or construction is considered to unnecessarily divert the gist of the present invention, such explanation has been omitted but would be understood by those skilled in the art. Numbers (e.g., one, two, etc.) used in the description of the present disclosure are merely identification symbols for discriminating one component from others.

In the following description, usage of suffixes such as 'module', 'part' or 'unit' used for referring to elements is given merely to facilitate explanation of the present invention, without having any significant meaning by itself.

Embodiments of the present invention will now be described in detail with reference to the accompanying drawings.

Figure 1:
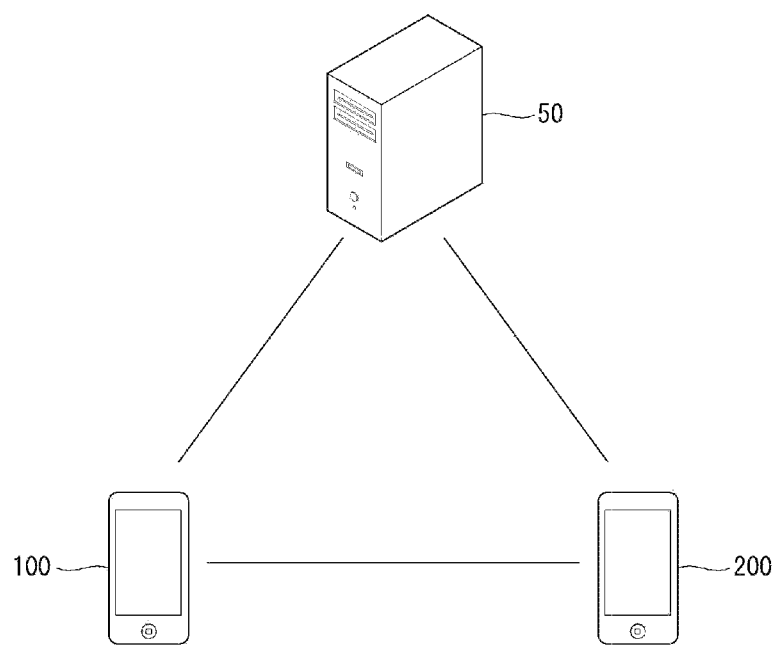
FIG. 1 is a schematic view showing a system environment according to embodiments of the present invention.

FIG. 1 is a schematic view showing a system environment according to embodiments of the present invention.

With reference to FIG. 1, the system environment according to an embodiment of the present invention may include at least one of a server 50, a first electronic device 100, and a second electronic device 200.

The server 50 may provide various types of data to the electronic devices 100 and 200. For example, the server 50 may provide content to the electronic devices 100 and 200. Content in this document may include video, still images, images, text, and the like, but the embodiments of content are not limited thereto.

The electronic devices 100 and 200 may communicate with the server 50 in order to receive various types of data, e.g., content, from the server 50.

The server 50 and the first and second electronic devices 100 and 200 may communicate in various manners. For example, the server 50 and the first and second electronic devices 100 and 200 may communicate with each other by using Wi-Fi, Bluetooth™, near field communication (NFC). However, these communication methods are merely examples and, the server 50 and the first and second electronic devices 100 and 200 may communicate through various other communication means that currently exist or that will be used in the future.

Electronic devices in this document may include various devices such as mobile phones, smart phones, notebook computers, laptop computers, digital broadcast terminals, personal digital assistants (PDA), portable multimedia players (PMP), navigation devices, fixed line phones, and the like.

In the following description, it is assumed that the first and second electronic devices 100 and 200 are smart phones. However, this is merely illustrative for the sake of convenience and the technical concept of the present invention is not limited to particular devices.

Figure 2:
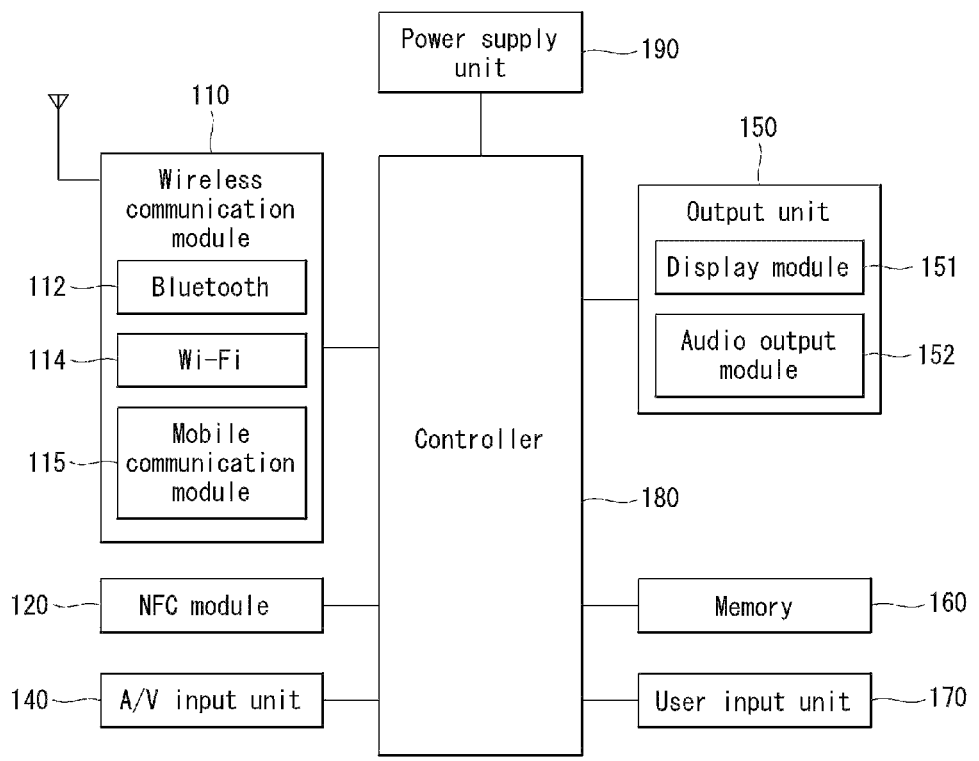
FIG. 2 is a schematic block diagram of a first electronic device 100 according to an embodiment of the present invention.

FIG. 2 is a schematic block diagram of the first electronic device 100 according to an embodiment of the present invention.

The first electronic device may 100 include a wireless communication module 110, a near field communication (NFC) module 120, an A/V (Audio/Video) input unit 140, an output unit 150, a memory 160, a user input unit 170, a controller 180, a power supply unit 190, and the like. The elements illustrated in FIG. 2 are not a requirement, and an electronic device having greater or fewer components may alternatively be implemented.

The elements of the first electronic device 100 which may be a mobile terminal will be described in detail as follows.

The wireless communication module 110 may include various communication modules which may be used for a data transmission between electronic devices. For example, the wireless communication module 110 may include at least a module for Bluetooth (802.15.1 IEEE) 112, a module for Wi-Fi (Wireless Fidelity) 114, and a mobile communication module 115. Also, the wireless communication module 110 may include various communication units such as an RFID (Radio Frequency Identification), a WiGig (Wireless Gigabit) communication module, and the like. Also, the wireless communication module 110 may include any other communication means which may be implemented currently or in the future.

The NFC module 120 refers to a module for NFC. NFC, a short-range contactless data transfer technology related to radio frequency identification (RFID), may be used for communication between devices located within 10 centimeters (preferably, 4 centimeters) from each other. An area in which an NFC link may be established through the NFC module will be referred to as an NFC area.

For example, the NFC link may use a center frequency of 13.56 MHz and is able to provide a transfer rate of 106 kbps, 212 kbps, and 424 kbps. The mentioned transfer rates are merely examples, and various other rates may be implemented.

NFC may have compatibility with a variety of contactless communication protocols. For example, NFC may be compatible with protocols defined by ISO 14443 type A, B, F, ISO 18092.

The A/V input unit 140 serves to receive an audio signal or a video signal. The A/V input unit 140 may include a camera, a microphone, and the like. At least one of the audio signal and the video signal input to the A/V input unit 140 may be transferred to a counterpart electronic device.

The output unit 150 serves to generate outputs in a visual, audible, and/or tactile manner. The output unit 150 may include a display module 151, an audio output module 152, and the like.

The display module 151 displays information processed in the first electronic device 100. For example, when the first electronic device 100 is in a call mode, the display module 151 displays a user interface (UI) or a graphic user interface (GUI) associated with a call. When the electronic device 100 is in a video call mode or an image capture mode, the display unit 151 may display a captured image and/or received image, a UI or GUI.

The display module 151 may include at least one of a liquid crystal display (LCD), a thin film transistor-LCD (TFT-LCD), an organic light emitting diode (OLED), a flexible display, and a three-dimensional (3D) display.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may output an audio signal related to a particular function performed in the first electronic device 100. The audio output module 152 may include a receiver, a speaker, a buzzer, etc.

The memory 160 may store programs used for the operations of the controller 180, or temporarily store data (e.g., a phonebook, messages, still images, video, etc.) that are input or output.

The memory 160 may also include at least one type of storage mediums including a flash memory, a hard disk, a multimedia card micro type, a card-type memory (e.g., SD or DX memory, etc), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. Also, the electronic device 100 may operate in relation to a Web storage device that performs the storage function of the memory 160 over the Internet.

The user input unit 170 may generate input data from commands entered by a user to control various operations of the first electronic device 100. The user input unit 170 may include a keypad, a dome switch, a touch screen, a touch pad (e.g., a touch sensitive member that detects changes in resistance, pressure, capacitance, etc. due to being contacted), a jog wheel, a jog switch, and the like. When the user input unit 170 is a touch screen, the user input unit 170 may also perform the function of the display module 151.

The controller 180 controls all operations of the electronic device 100.

The power supply unit 190 receives external power or internal power and supplies appropriate power required for operating respective elements and components under the control of the controller 180.

Various embodiments described herein may be implemented in a computer-readable recording medium or its similar medium by using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 3:
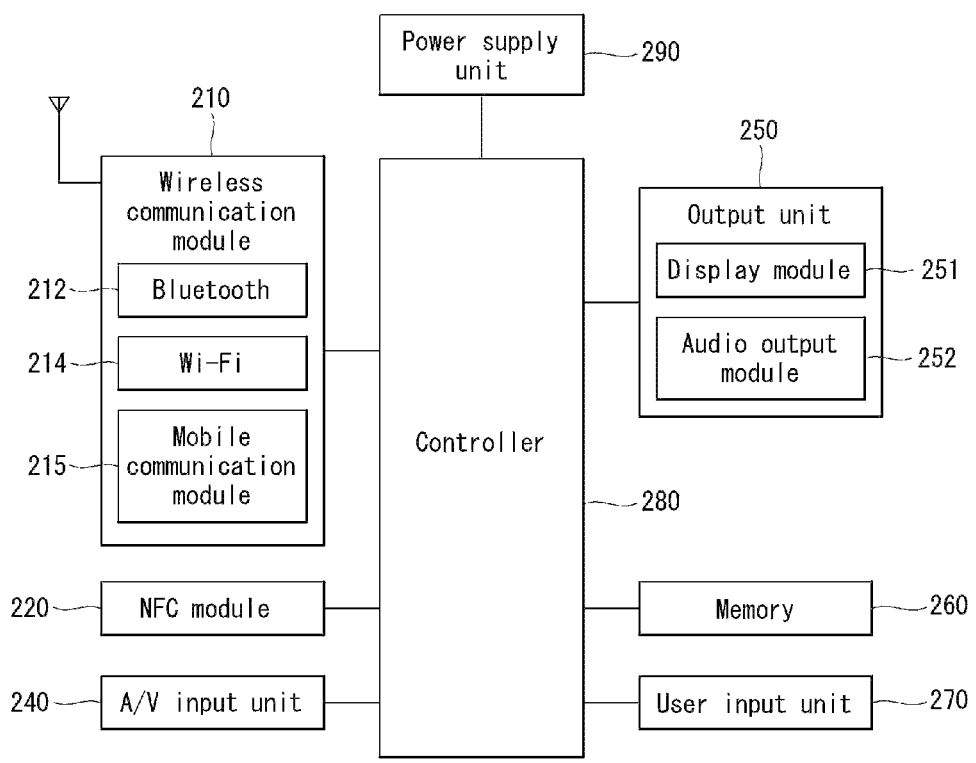
FIG. 3 is a schematic block diagram of a second electronic device 200 according to an embodiment of the present invention.

FIG. 3 is a schematic block diagram of the second electronic device 200 according to an embodiment of the present invention.

The second electronic device 200 illustrated in FIG. 3 may have a configuration corresponding to that of the first electronic device 100 illustrated in FIG. 2, so a detailed description thereof will be omitted.

FIG. 4 is a view for explaining NFC according to an embodiment of the present invention.

The NFC module 120 of the first electronic device 100 and the NFC module 220 of the second electronic device may establish an NFC link. The NFC link may be established when the both devices are within a predetermined communication distance.

With reference to FIG. 4(a), the NFC module 120 of the first electronic device 100 has a communication radius R1, and the NFC module 220 of the second electronic device 200 has a communication radius R2. As shown in FIG. 4(a), when the second electronic device is not positioned within the communication radius R1 of the first electronic device, the NFC link is not established.

With reference to FIG. 4(b), the second electronic device 200 moves to be within the communication radius R1 of the first electronic device 100. In this case, because the first and second electronic devices 100 and 200 are located within the predetermined communication radius, the NFC link is established between the first and second electronic devices 100 and 200.

In detail, in a state in which the NFC module 120 of the first electronic device 100 radiates electromagnetic waves to the periphery, when the second electronic device 200 moves to be within the predetermined distance, i.e., to be within the communication radius from the first electronic device 100, the second electronic device 200 recognizes electromagnetic waves radiated from the first electronic device 100. The second electronic device 200 transmits a response message indicating that it has recognized the electromagnetic waves from the first electronic device 100, to the first electronic device 100 through the NFC module 220. Accordingly, an NFC link is established between the first and second electronic devices 100 and 200.

In this case, the second electronic device 200 may transmit the response message to the first electronic device 100 by using electromagnetic waves obtained from the NFC module 120 of the first electronic device 100, or may transmit the response message to the first electronic device 100 by using energy of the second electronic device 200 itself. In the following description, the case in which the second electronic device 200 uses the electromagnetic wave energy obtained from the first electronic device 100 in transmitting the response message will be referred to as a passive mode, and the case in which the second electronic device 200 uses its own energy in transmitting the response message will be referred to as an active mode.

Also, a device, like the first electronic device 100, that radiates the electromagnetic waves to establish the NFC link will be referred to as an NFC reader, and a device, like the second electronic device 200, that receives electromagnetic waves to establish the NFC link will be referred to as an MNFC card emulation.

As described above, when the NFC modules 120 and 220 use the band having the center frequency of 13.56 MHz, the communication radius may be within 10 centimeters. Thus, when the distance between the first and second electronic devices 100 and 200 is within 10 centimeters, the NFC link may be automatically established between the first and second electronic devices 100 and 200.

Hereinafter, in the present document, the process of establishing the NFC link by making both devices approach will be referred to as tagging.

Figure 5:
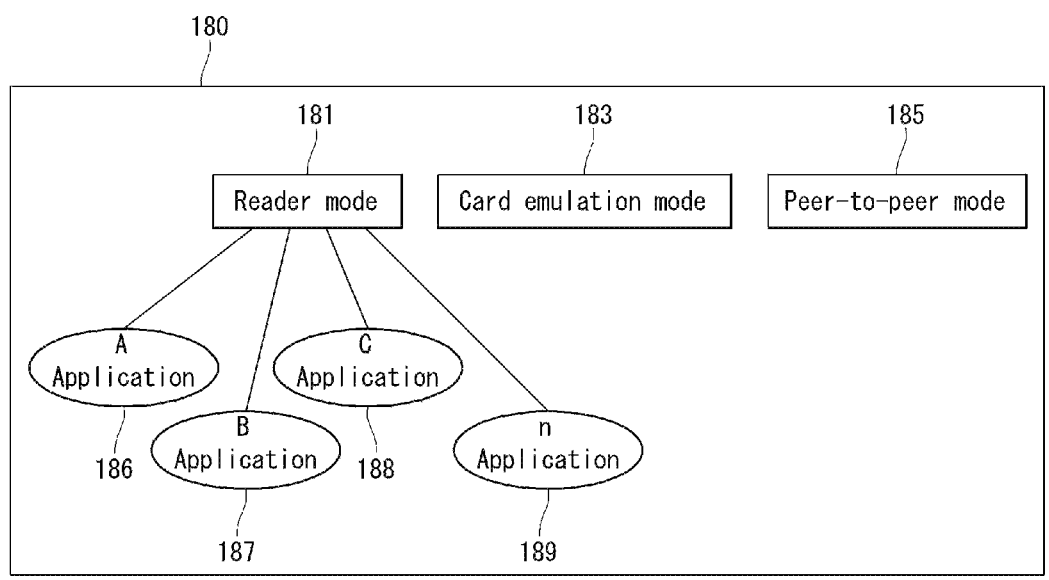
FIG. 5 is a schematic block diagram of a controller related to NFC according to an embodiment of the present invention.

FIG. 5 is a schematic block diagram of the controller 180 for NFC according to an embodiment of the present invention.

The first and second electronic devices 100 and 200 may operate in accordance with various NFC modes through the NFC link.

As shown in FIG. 5, the controller 180 of the first electronic device 100 may perform a reader mode 181, a card emulation mode 183, and a peer-to-peer mode 185. The various NFC modes performed by the controller 180 of the first electronic device 100 may also be performed by a controller 280 of the second electronic device 200. Thus, the description of the controller 180 of the first electronic device 100 will be used to be the same as a description of the controller 180 of the second electronic device 200.

When the controller 180 operates in the reader mode 181, the controller 180 may communicate with a different electronic device that operates in the card emulation mode through the NFC module 120. For example, when the controller 180 operates in the reader mode 181, the controller 180 may command the different electronic device operating in the card emulation mode to perform writing, reading, erasing, or the like, In this case, the controller 180 may receive a selection as to which of NFC applications are to be performed in the reader mode 181. For example, one of A application 186, B application 187, C application 188, and n application 189, as shown in FIG. 5, may be performed or executed. Here, the applications may correspond to certain functions. Such applications may be stored in the memory 160.

When the user selects a certain function to be performed in the reader mode, the first electronic device 100 (for example) radiates electromagnetic waves having a center frequency of 13.56 MHz through the NFC module 120. In this case, when the second electronic device 200 enters the communication radius R1 (See FIG. 4) of the first electronic device 100, an NFC link is established between the first and second electronic devices 100 and 200. In this case, the first electronic device 100 operates in the reader mode in which the first electronic device performs the selected certain function, and the second electronic device 200 operates in the card emulation mode with respect to the selected certain function.

In the reader mode 181, a certain NFC application may be selectively performed at various points in time. For example, after a particular NFC application is selected, the NFC link may be established. Alternatively, after the NFC link is established, the particular NFC application may be selected.

Subsequently, when the controller 180 operates in the card emulation mode 183, the controller 180 may communicate with a different electronic device (e.g., second electronic device 200) operating in the reader mode through the NFC module 120.

When the controller 180 operates in the peer-to-peer mode 185, the controller 180 may exchange data with a different electronic device (e.g., second electronic device 200) operating in the peer-to-peer mode through the NFC module 120.

Hereinafter, a method for operating an electronic device using NFC according to an embodiment of the present invention will now be described. For the sake of brevity, the environment and devices illustrated in FIGS. 1 to 5 will be referred to in describing the present embodiment. This is merely for the sake of explanation and the technical concept of the present invention is not limited to the particular environment or the particular devices.

Figure 6:
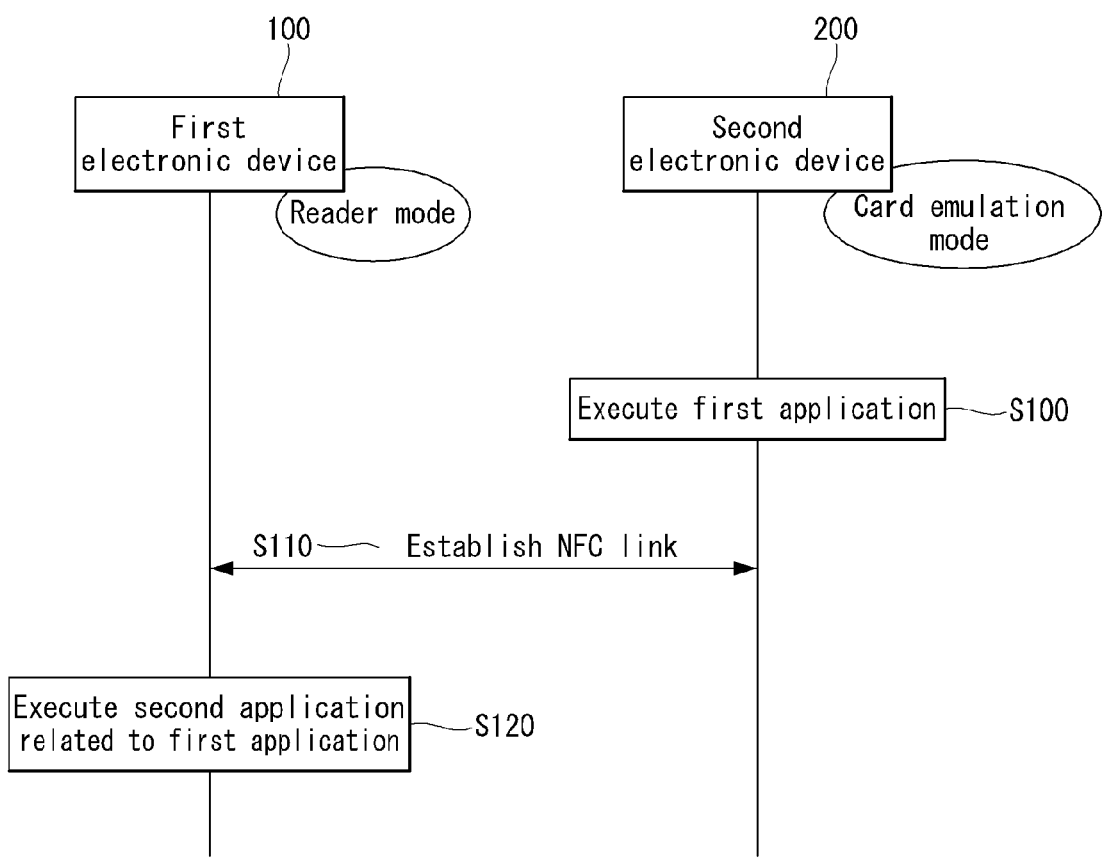
FIG. 6 is a flow chart illustrating the process of a method for operating an electronic device using NFC according to an embodiment of the present invention.

FIG. 6 is a flow chart illustrating the process of a method for operating an electronic device using NFC according to an embodiment of the present invention. The devices illustrated in FIGS. 1 to 5 may perform the method of FIG. 6.

According to the method for operating an electronic device using NFC according to an embodiment of the present invention, an electronic device recognizes a user intention of tagging and automatically executes an application fitting the recognized user intention, thus improving user convenience.

To this end, the method for operating an electronic device using NFC according to an embodiment of the present invention may include at least one of step S100 of executing a first application by a second electronic device, step S110 of establishing an NFC link between the first electronic device 100 and the second electronic device 200 while a first application is being executed, and step S120 of executing a second application related to the first application by the first electronic device 100. Each of the steps will now be described in detail.

The second electronic device 200 executes the first application in step S100.

Here, the first application may include various applications such as a content output, a message output, a video call, or the like. Also, the first application may include various other applications.

The user may view or listen to content, check a message, perform video call, or the like, through the second electronic device 200 in step S100.

The first electronic device 100 establishes the NFC link with the second electronic device 200 in step S110.

The first electronic device 100 establishes the NFC link with the second electronic device 200 which is performing the first application. Here, it is assumed that the first electronic device 100 operates in the reader mode 181 and the second electronic device operates in the card emulation mode. In this case, as described above with reference to FIG. 4, an NFC link is established between the first and second electronic devices 100 and 200 as the first electronic device 100 radiates electromagnetic waves of a band having a center frequency of 13.56 MHz and the first and second electronic devices 100 and 200 to be closer to each other within a predetermined distance.

The user may select an NFC application to be performed by the first electronic device 100 in the reader mode before the NFC link is established. For example, the user may select an NFC application for executing the second application related to the first application being performed by the second electronic device 200, in the first electronic device 100 through the NFC link.

The first electronic device 100 executes the second application related to the first application being executed in the second electronic device 200 in step S120.

The first electronic device 100 obtains information related to the first application being executed in the second electronic device 200 through the NFC link established in step S110, thus executing the second application related to the first application. To this end, the first electronic device 100 may request the information related to the first application from the second electronic device 200.

The first application being executed in the second electronic device 200 may be recognized in various manners. For example, an application being executed on the entire window of the display module of the second electronic device 200 may be recognized as a first application, or alternatively, an application activated among various application-related windows being executed in the second electronic device 200 may be recognized as the first application.

The second application may vary. For example, the second application related to the first application may be the same or different from the first application. Also, a plurality of second applications may be related to the first application. Also, the second application related to the first application may be designated by the user or automatically set.

In detail, when the first application is a content application, the second application may be an application for reproducing content being reproduced in the second electronic device 200. Also, when the first application is a message application, the second application may be a reply application with respect to a message being output on the second electronic device 200.

In this manner, the first electronic device 100 is able to automatically perform the second application related to the first application being performed by the second electronic device 200 through the simple operation of tagging with the second electronic device 200 which is performing the first application, thus obtaining context awareness. Thus, the user does not need to perform an additional action to execute the second application, so user convenience can be improved.

Detailed operating methods performed when the first application is a content output application, when the first application is a message output, and when the first application is a video call will now be described.

Figure 7:
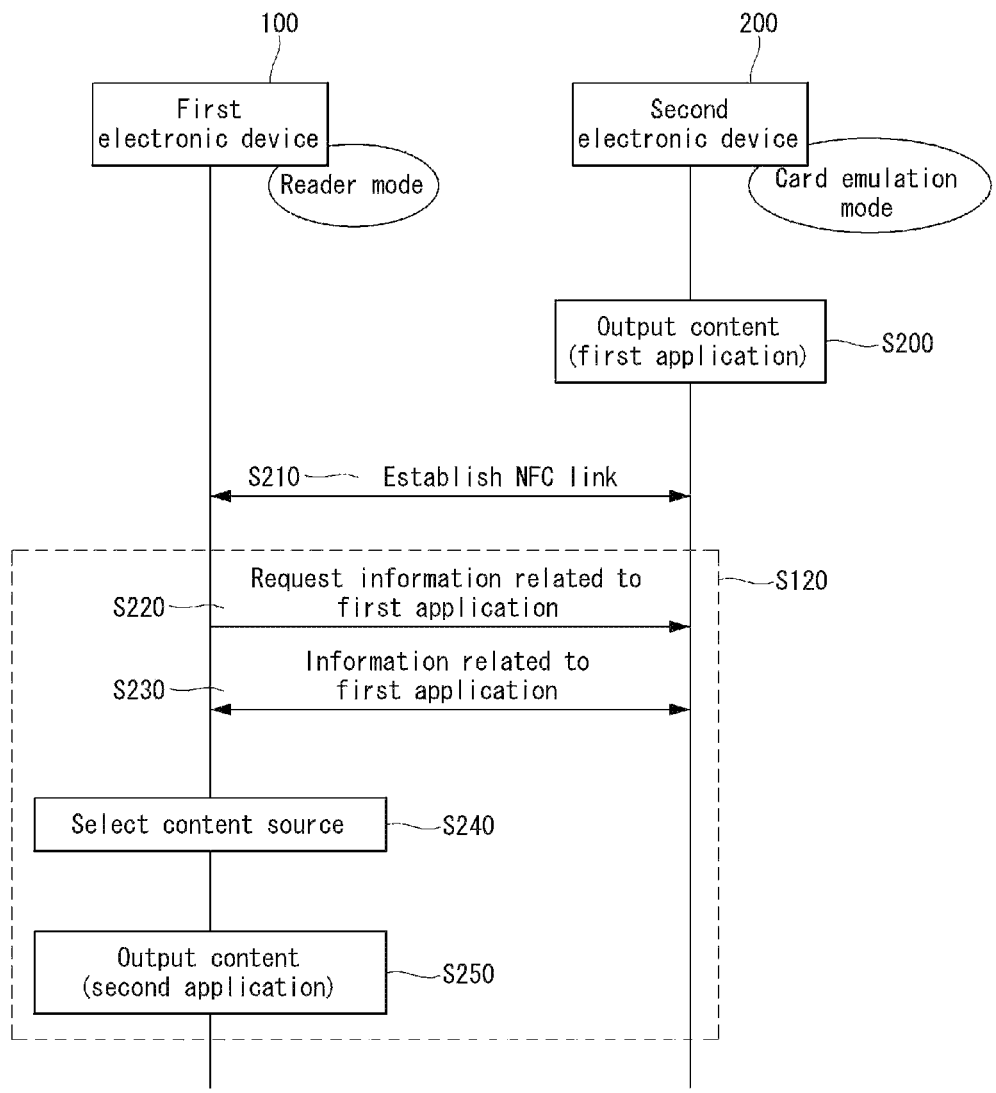
FIG. 7 is a flow chart for explaining a specific example of the method for operating an electronic device with reference to FIG. 6 according to an embodiment of the present invention.

FIG. 7 is a flow chart for explaining a specific example of the method for operating an electronic device with reference to FIG. 6 according to an embodiment of the present invention. The devices illustrated in FIGS. 1 to 5 may perform the method of FIG. 7.

Figure 8:
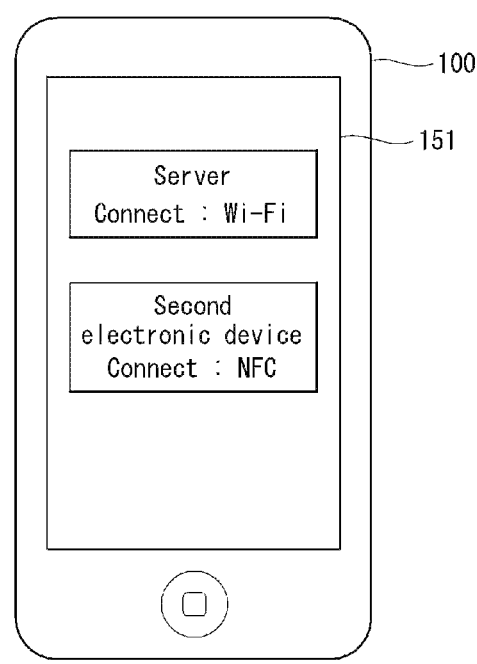
FIGS. 8 to 10 are views for explaining specific examples of the method for operating an electronic device according to an embodiment of the present invention.
Figure 9:
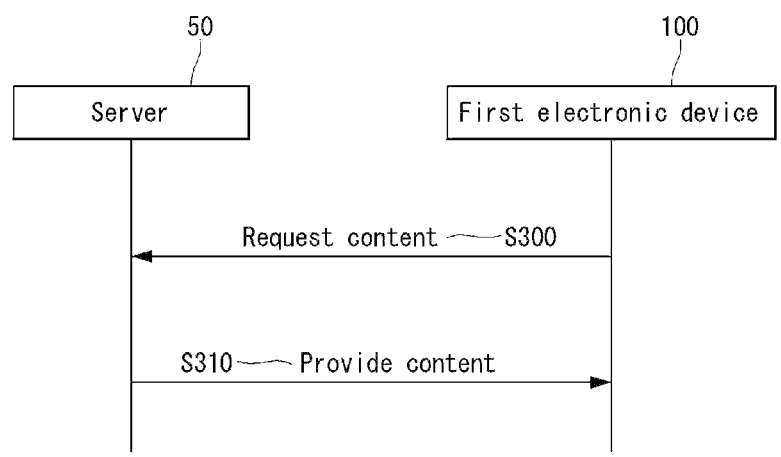
Figure 10:
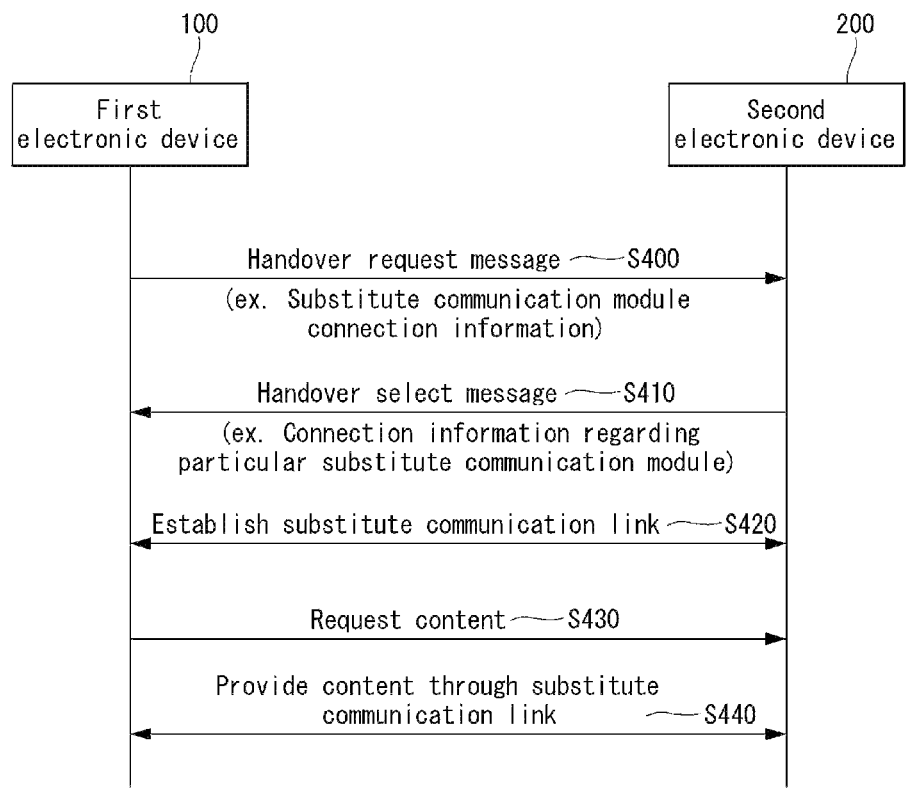

A specific example of the method for operating an electronic device illustrated in FIG. 7 will be described with reference to FIGS. 8 to 10. FIGS. 8 to 10 are views for explaining specific examples of the method for operating an electronic device according to an embodiment of the present invention.

With reference to FIG. 7, a method for operating an electronic device according to an embodiment of the present invention may include at least one of step S200 of outputting content as a first application from the second electronic device 200, step S210 of establishing an NFC link between the first and second electronic devices 100 and 200, step 220 of requesting, by the first electronic device 100, information related to the first application being performed by the second electronic device 200 from the second electronic device 200, step S230 of transmitting, by the second electronic device 200, the information related to the first application being performed to the first electronic device 100, step S240 of selecting a content source based on the information related to the application, and step S250 of outputting content according to the selected content source. Each of the steps will now be described in detail.

The second electronic device 200 may output content (step S200).

Here, the second electronic device 200 is performing a content output application as an example of the first application in step S100 of FIG. 6. In this case, the user of the second electronic device 200 may view or enjoy the content through the output unit 250 of the second electronic device 200.

Here, the content output by the second electronic device 200 may be content (e.g., video, audio, text, image, data, etc.) stored in the second electronic device 200 or may be content provided from an external server of the second electronic device 200.

An NFC link is established between the first and second electronic devices 100 and 200 (step S210).

The NFC link is established between the first and second electronic devices 100 and 200 while the second electronic device 200 is outputting the content. Here, the NFC link is established in the same manner as described above, so a detailed description thereof will be omitted.

In this embodiment, it is assumed that the first electronic device 100 operates in the reader mode and the second electronic device 200 operates in the card emulation mode like the embodiment as described above with reference to FIG. 6.

The first electronic device 100 requests information related to the first application being performed by the second electronic device 200 from the second electronic device 200 (step S220).

Here, the first electronic device may request the information related to the first application being performed by the second electronic device 200 from the second electronic device 200 through the NFC link established in step S210.

The second electronic device 200 transmits the information related to the first application being performed to the first electronic device 100, in response to the request from step S220 (step S230).

To this end, the second electronic device 200 generates the information related to the first application being performed by the second electronic device 200. The information related to the first application may include at least one of information indicating the type of an application (referred to as 'application type information', hereinafter) and supplementary information.

The application type information, indicating the type of the application being performed by the second electronic device 200, may be classified depending on the application being performed by the second electronic device 200.

In the present embodiment described with reference to FIG. 7, the first application is a content reproduction application. Thus, the application type information may include information indicating that the first application is a content reproduction application.

The supplementary information generally refers to information added in relation to the first application.

In the present embodiment, because the first application is a content reproduction application, the supplementary information may include at least one type of content source information regarding content being output on the second electronic device 200. For example, the content source information may include a device identifier in which content is stored and position information. In detail, the device identifier may be an IP address of a device providing content, and the position information may indicate the position of content stored in the device providing the content. Thus, the content source information may be expressed as a URI. In this case, the content source may be a plurality of source devices or a plurality of source files stored in a single source device. Here, it is assumed that content is stored in the server 50 and the second electronic device 200, for the sake of brevity.

The second electronic device 200 may transmit the generated information related to the first application to the first electronic device 100 through the NFC link.

The first electronic device 100 may select a content source (step S240).

The first electronic device 100 may decode the information related to the first application obtained in step S230 to thus obtain at least one of the first application type information and the supplementary information included in the information related to the first application. In this case, the first electronic device 100 may obtain the information indicating that the first application is a content reproduction application from the first application type information of the information related to the first application and one or more types of contents source information as supplementary information.

The first electronic device 100 may select particular content from the one or more types of obtained source information. In this case, the first electronic device 100 may automatically select particular source information according to a predetermined method or the user of the first electronic device 100 may select particular source information. To this end, as shown in FIG. 8, in order to allow the user to select the particular source information, the first electronic device 100 may provide a user interface. Then, the user may select a source device from which content, which will be reproduced in the first electronic device 100, is to be provided through the user interface.

Then the first electronic device 100 may receive content from the selected source and output the context (step S250).

In this case, the first electronic device 100 may receive the content in various manners according to the source device providing the content and a communication means of the first electronic device 100. For example, the first electronic device 100 may operate in various manners depending on whether or not the first electronic device 100 is connected through a different communication method other than NFC or whether or not the first electronic device 100 is connected through NFC.

In the following description, as shown in FIG. 8, it is assumed that the first electronic device 100 and the server 50 are connected according to a different communication method (e.g., Wi-Fi) other than NFC, and the first electronic device 100 and the second electronic device 200 are connected through NFC.

First, the case in which the server 500 connected with the first electronic device 100 through Wi-Fi is selected as a content source by the user at step S240 will now be described with reference to FIG. 9.

FIG. 9 is a flow chart illustrating the process of a method for receiving content according to an embodiment of the present invention. The devices illustrated in FIGS. 1 to 5 may perform the method of FIG. 9.

With reference to FIG. 9, the first electronic device 100 may request content from the server 50 (step S300).

To this end, the first electronic device 100 may generate a content request message to be transmitted to the server 50. The content request message may include source information of content stored in the server 50.

When the server 50 receives the content request message from the first electronic device 100, it may provide the requested content to the first electronic device 100 (step S310).

Here, the server 50 may transmit the particular content selected based on the source information obtained from the first electronic device, to the first electronic device 100.

In this case, the server 50 may transmit the selected content to the first electronic device 100 in various manners. For example, the server 50 may transmit the requested content directly to the first electronic device 100. Alternatively, the server 50 may transmit the requested content to the first electronic device 100 in a multicasting manner. In this case, the first electronic device 100 and the second electronic device 200 can output the same part, so the user can view or enjoy the content simultaneously through the second electronic device 200 and the first electronic device 100. Alternatively, the server 500 may provide the requested content to the first electronic device 100 in a streaming manner or in a downloading manner.

Accordingly, the first electronic device 100 may receive the content, which is also being output on the second electronic device 200, from the server 50.

In this manner, the first electronic device 100 may be provided with the content from the device, such as the server 50, connected according to a different method other than NFC.

Hereinafter, a case in which the second electronic device 200 connected with the first electronic device 100 through NFC is selected as a content source device by the user will now be described with reference to FIG. 10.

FIG. 10 a flow chart illustrating the process of a method for receiving content according to an embodiment of the present invention. The devices illustrated in FIGS. 1 to 5 may perform the method of FIG. 10.

When the content source is the second electronic device 200 and the first electronic device 100 and the second electronic device 200 are connected through the NFC link as mentioned above, the NFC link will be maintained only if the first electronic device 100 and the second electronic device 200 are within a predetermined distance to each other while the first electronic device 100 is receiving content from the second electronic device 200. However, maintaining the first electronic device 100 within the predetermined distance from the second electronic device 200 while an application is operating may cause user inconvenience. Thus, in an effort to address this limitation, the first electronic device may establish a substitute communication link through the NFC link with the second electronic device 200 so as to be provided with content from the second electronic device through the substitute communication link.

To this end, the first electronic device 200 may transmit a handover request message to the second electronic device 200 (step S400).

The handover request message is a message requesting the establishment of the substitute communication link through the NFC link established between the first and second electronic devices 100 and 200.

The handover request message may include information regarding a substitute communication module supported by the first electronic device 100. Here, the substitute communication module may have a larger communication radius and a faster communication rate than those of the NFC module.

For example, the handover request message may include connection information regarding the Bluetooth communication module 112 and the Wi-Fi communication module 14 as substitute communication modules supported by the first electronic device 100.

The second electronic device 200 transmits a response message with respect to the handover request message to the first electronic device 100 (step S410).

To this end, the second electronic device 200 generates the response message based on the received handover request message. In the following description, the response message with respect to the handover request message will be referred to as a handover selection message. The second electronic device 200 selects a communication module supported by the second electronic device 200 from among the substitute communication modules, i.e., the Bluetooth communication module and the Wi-Fi communication module, included in the handover request message. When the second electronic device 200 supports Bluetooth™ and Wi-Fi, it may select a particular substitute communication module according to predetermined priority. In this embodiment, the second electronic device 200 supports both Bluetooth™ and Wi-Fi, substitute communication modules supported by the first electronic device 100, so it is assumed that the second electronic device 200 selects Wi-Fi as a substitute communication means.

When the second electronic device 200 selects Wi-Fi as a substitute communication means, the second electronic device 200 transmits a handover selection message including connection information, e.g., an SSID, required for a Wi-Fi connection between the first and second electronic devices 100 and 200 to the first electronic device 100.

Alternatively, when the second electronic device 200 selects Bluetooth™ as a substitute communication means, the second electronic device 200 will transmit a handover selection message including connection information required for Bluetooth paring between the first and second electronic devices 100 and 200 to the first electronic device 100.

When the first electronic device 100 receives the handover selection message from the second electronic device 200, the first electronic device 10 establishes a substitute communication link based on the handover selection message (step S420).

To this end, the first electronic device 100 decodes the handover selection message to obtain the connection information regarding the substitute communication means selected by the second electronic device 200. As mentioned above, in this example the second electronic device 200 has selected Wi-Fi as a substitute communication means. In this case, the first electronic device 100 requests a Wi-Fi connection from the second electronic device 200 based on the connection information included in the handover selection message, whereby the Wi-Fi connection between the first and second electronic devices 100 and 20 is formed as a substitute communication link.

The first electronic device 100 requests content, which is also being output by the second electronic device 200, from the second electronic device 200 (step S430).

In this case, the first electronic device 100 may request content being output by the second electronic device 200 by transmitting source information selected beforehand to the second electronic device 200.

Here, the first electronic device 100 may request content from the second electronic device 200 in various manners. For example, step S430 may be performed through a message transmitted by the first electronic device 100 to the second electronic device 200. Alternatively, the content request may be included in the handover request message in step S400 and transmitted from the first electronic device 100 to the second electronic device 200. In this case, step S430 may be omitted.

The second electronic device 200 transmits the requested content to the first electronic device 100 (step S440).

In this case, the second electronic device 200 transmits the requested content to the first electronic device 100 through the substitute communication link, i.e., Wi-Fi, established between the first and second electronic devices 100 and 200. In this case, the second electronic device 200 may transmit the content to the first electronic device 100 in various manners as mentioned above.

Thus, because the substitute communication link is used to receive the content from the second electronic device 200 to the first electronic device 100, the NFC link is not required to continue between the first and second electronic devices 100 and 200. Thus, the user can freely move the first electronic device 100 while receiving the content from the second electronic device 200.

The method for receiving content by the first electronic device 100 according to the type of the communication link between the first electronic device 100 and the electronic device providing the content has been described. In the above description, it is assumed that the user selects particular source information for providing the content, but the present invention is not limited thereto and, of course, the first electronic device 100 may select particular source information and is provided with content according to the embodiments described above with reference to FIGS. 9 and 10 according to a communication method with a device designated by the selected source information.

With reference back to FIG. 7, the first electronic device 100 outputs the received content (step S250). To this end, the first electronic device 100 executes the content reproduction application as the second application related to the first application based on the information related to the type of the application obtained in step S230. Also, the first electronic device 100 outputs the content provided from the source device selected in step S240 through the content application as the second application.

According to the embodiments described above with reference to FIGS. 7 to 10, although the user does not execute the content reproduction application as the second application in the first electronic device 100, the second application can be automatically executed by tagging the first electronic device 100 to the second electronic device 200. In addition, the first electronic device 200 may reproduce the content at the same point in time as that of the content being output on the second electronic device 200 through the second application. Thus, because the first electronic device can serve as a multi-screen with respect to the second electronic device 200 and the first electronic device outputs the same content of the second electronic device 100 at the same time, the user can view the content using the first or second electronic device while moving and the user convenience can increase.

A case in which a message application is being executed as a first application will now be described.

Figure 11:
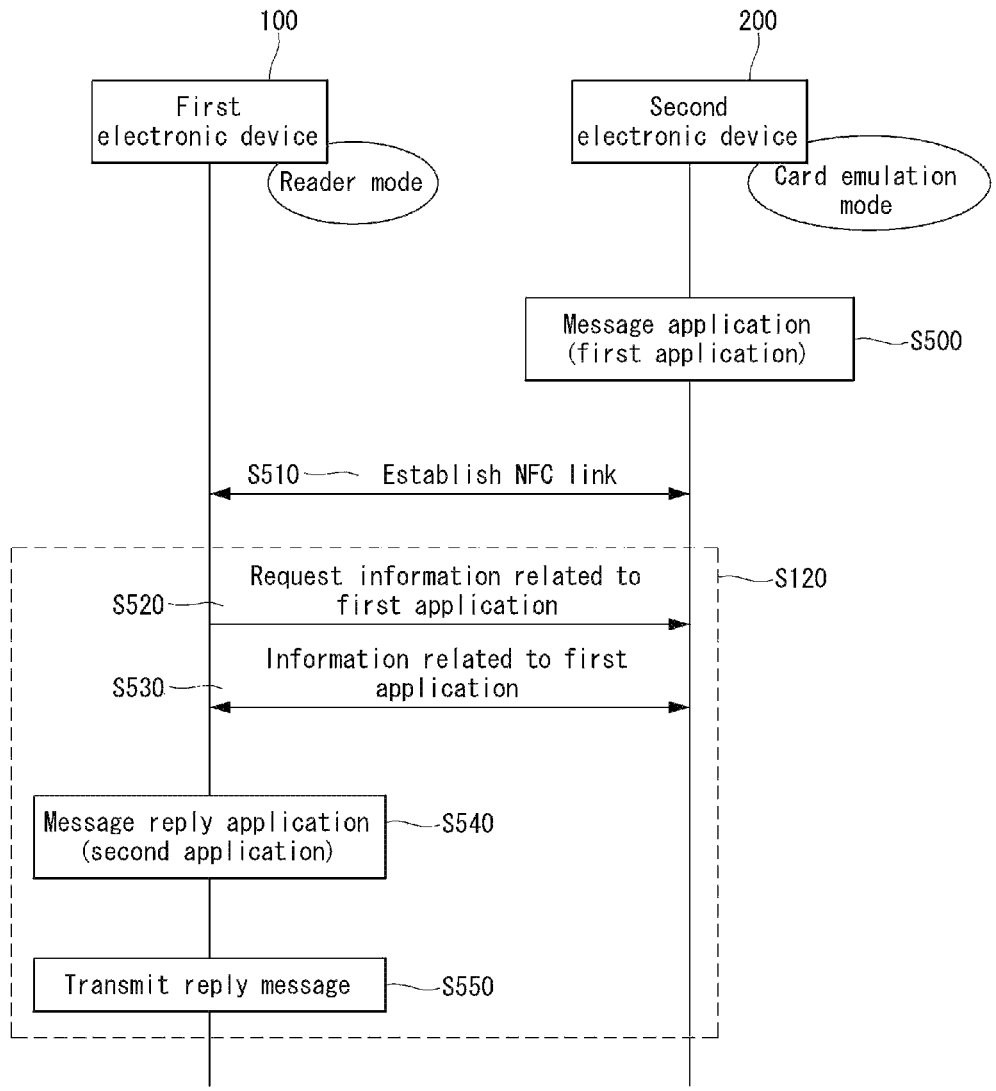
FIG. 11 is a flow chart for explaining a specific example of the method for operating an electronic device with reference to FIG. 6 according to an embodiment of the present invention.

FIG. 11 is a flow chart for explaining a specific example of the method for operating an electronic device with reference to FIG. 6 according to an embodiment of the present invention. The devices illustrated in FIGS. 1 to 5 may perform the method of FIG. 11.

Figure 12:
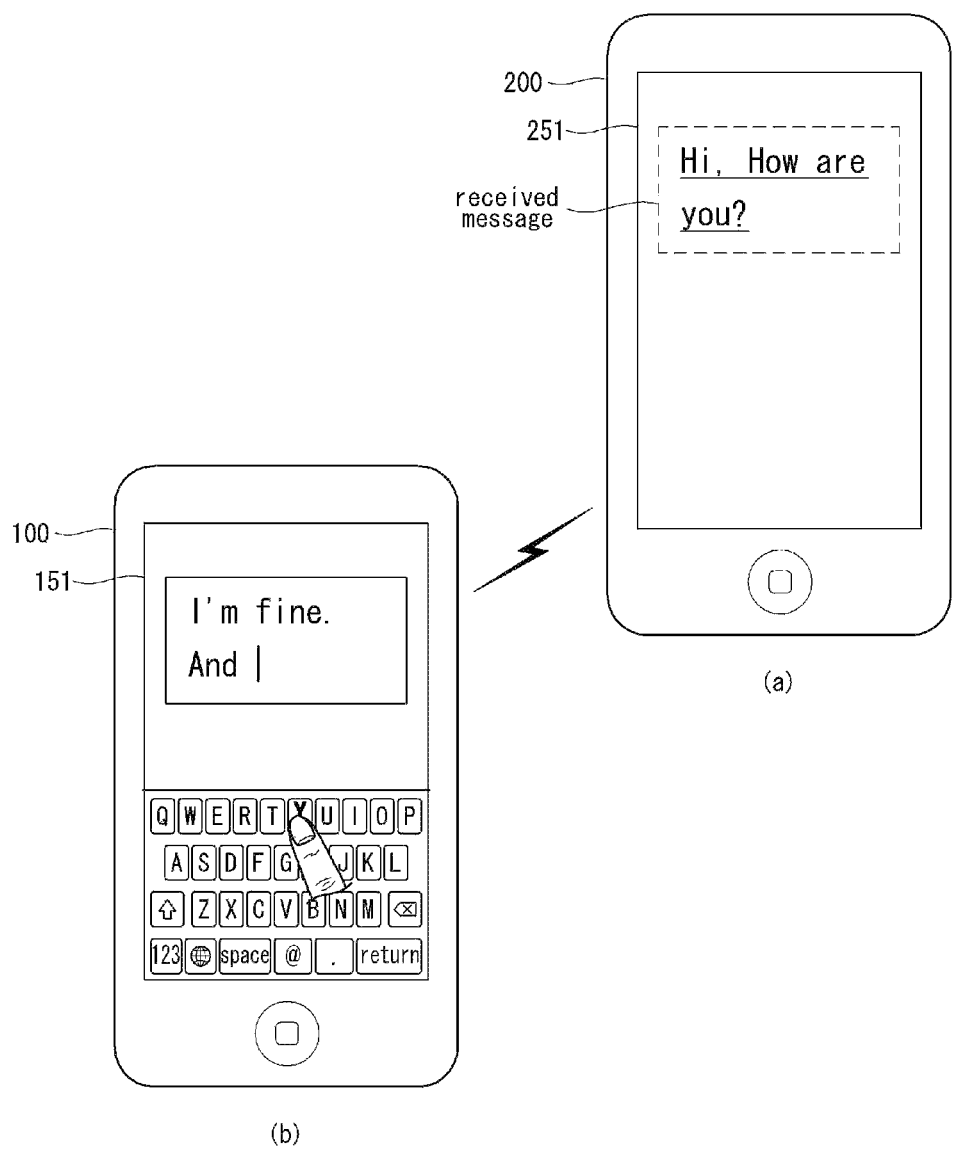
FIG. 12 is a view for explaining a specific example of a method for operating an electronic device according to an embodiment of the present invention.

A specific example of the method for operating an electronic device illustrated in FIG. 11 will be described with reference to FIG. 12. FIG. 12 is a view for explaining a specific example of a method for operating an electronic device according to an embodiment of the present invention.

A method for operating the first and second electronic devices 100 and 200 when the first application being performed in the second electronic device 200 is a message application will now be described with reference to FIG. 11.

With reference to FIG. 11, the method for operating an electronic device according to an embodiment of the present invention may include at least one of a step S500 of executing a message application in the second electronic device, step S510 of establishing an NFC link between the first and second electronic devices 100 and 200, step S520 of requesting, by the first electronic device, information related to a first application being performed by the second electronic device 200 from the second electronic device 200, step S530 of transmitting, by the second electronic device 200, the information related to the first application to the first electronic device 100, step S540 of executing, by the first electronic device 100, a message response application as a second application, and step S550 of receiving, by the first electronic device 100, a response and transmitting the received response. Each of the steps will now be described in detail. In this case, steps corresponding to the foregoing embodiment will be briefly described for the sake of brevity.

The second electronic device 200 outputs a message by executing a first application in step S500. For example, the second electronic device 200 is executing a message application as an example of the first application in step S100 of FIG. 6. In this case, the user of the second electronic device 200 can check a message through the output unit 250 of the second electronic device 200. The message in this document can be a SMS (short message service) message, an MMS (multimedia message service) message, an IM (instance message), and an e-mail.

The first electronic device 100 establishes an NFC link with the second electronic device 200 while the second electronic device 200 is outputting the message, in step S510, and requests information related to the first application being performed by the second electronic device 200, from the second electronic device 200 through the NFC link in step S520. This is preferably the same as described above, so a detailed description thereof will be omitted.

The second electronic device 200 transmits the information related to the first application requested by the first electronic device 100 to the first electronic device 100 in step S530. To this end, the second electronic device 200 generates the information related to the first application being performed by the second electronic device 200. The information related to the first application may include at least one of information indicating the type of the application and supplementary information.

The information indicating the type of the application can include information indicating the message application because the second electronic device 200 is currently outputting a message using the first application.

The supplementary information includes at least one of identification information and a destination address of the message being outputted. Here, when the type of the message is an SMS, an MMS, or an IM, the destination address may refer to a phone number of a counterpart, and when the type of the message is an e-mail, the destination address may be an e-mail address of a counterpart. A detailed function of the destination address and the message identification information will be described later.

The first electronic device 100 executes a message reply application by executing a second application in step S540. To this end, the controller 180 of the first electronic device 100 decodes the information related to the first application received from the second electronic device 200, thus obtaining application type information and supplementary information included in the application related information. The first electronic device 100 may obtain information indicating that the first application being currently performed in the second electronic device 200 is a message application through the application type information. Thus, the first electronic device 100 may execute a message reply application as the second application related to the first application. As the first electronic device 100 executes the message reply application, the user can generate a reply message with respect to the message being output on the second electronic device 200 through the first electronic device 100 (step S550).

For instance, with reference to FIG. 12, while checking the message being output on the second electronic device 200 as shown in FIG. 12(a), the user may input the reply message with respect to the message being output on the second electronic device 200 through the first electronic device 100 as shown in FIG. 12(b). Thus, because the user can generate the reply message while continuously checking the received original text message, user convenience can be improved in generating the reply message.

The first electronic device 100 may receive an input from the user as a reply to the received message and transmit the input reply to the second electronic device 200 in step S550.

Here, the first electronic device 100 may transmit the generated reply to a counterpart device in various manners. For example, the first electronic device 100 may transmit the generated reply directly to the counterpart. Alternatively, the first electronic device 100 may transmit the generated reply to the second electronic device 200, and the second electronic device 200 may transmit the reply to the counterpart. Details thereof will now be described.

When the first electronic device 100 transmits the generated reply directly to the counterpart (e.g., the second electronic device 200 or another device, the destination address information included in the supplementary information of the application related information obtained beforehand may be used. The first electronic device 100 may transmit the generated reply directly to the counterpart by obtaining a phone number or an e-mail address of the counterpart through supplementary information.

Meanwhile, when the first electronic device 100 transmits the generated reply to the counterpart through the second electronic device 200, the message identification information included in the supplementary information of the application related information obtained beforehand may be used. The first electronic device 100 transmits at least one of the generated reply and the message identification information to the second electronic device 200. The second electronic device 200 transmits the reply obtained from the first electronic device 100 to the counterpart. In this case, the second electronic device 200 may check to which of original text messages the reply is related based on the message identification information obtained from the first electronic device 100, and transmit the reply message to a sender of the original text message. Thereafter, the second electronic device 200 may store the original text message and the reply message such that they are associated based on the message identification information. In this case, the first electronic device 100 may transmit the reply message to the second electronic device through the NFC link or through the substitute communication link as described above.

According to the specific example described above with reference to FIGS. 11 and 12, although the user does not request a message reply application (the second application) from the first electronic device 100, the first electronic device 100 automatically selects and executes the message reply application as the second application, thus increasing user convenience.

Meanwhile, the case in which the second electronic device 200 outputs the original text message and the first electronic device 100 generates the reply message has been described in the second embodiment, but the present invention is not limited thereto and the second electronic device 200 may generate a reply message and the first electronic device 100 may output the original text message. In this case, which of the first and second electronic devices 100 and 200 is to output the original text message and which of them is to generate the reply message may be determined in consideration of the characteristics of the display modules of the first and second electronic devices 100 and 200. For example, an electronic device having a larger display screen among the first and second electronic devices 100 and 200 may output the original text message and an electronic device having a smaller display screen among the first and second electronic devices 100 and 200 may output the reply message, thus allowing the user to generate the reply message while checking the original text message through the larger screen.

The case in which a video call application is being executed as a first application will now be described.

Figure 13:
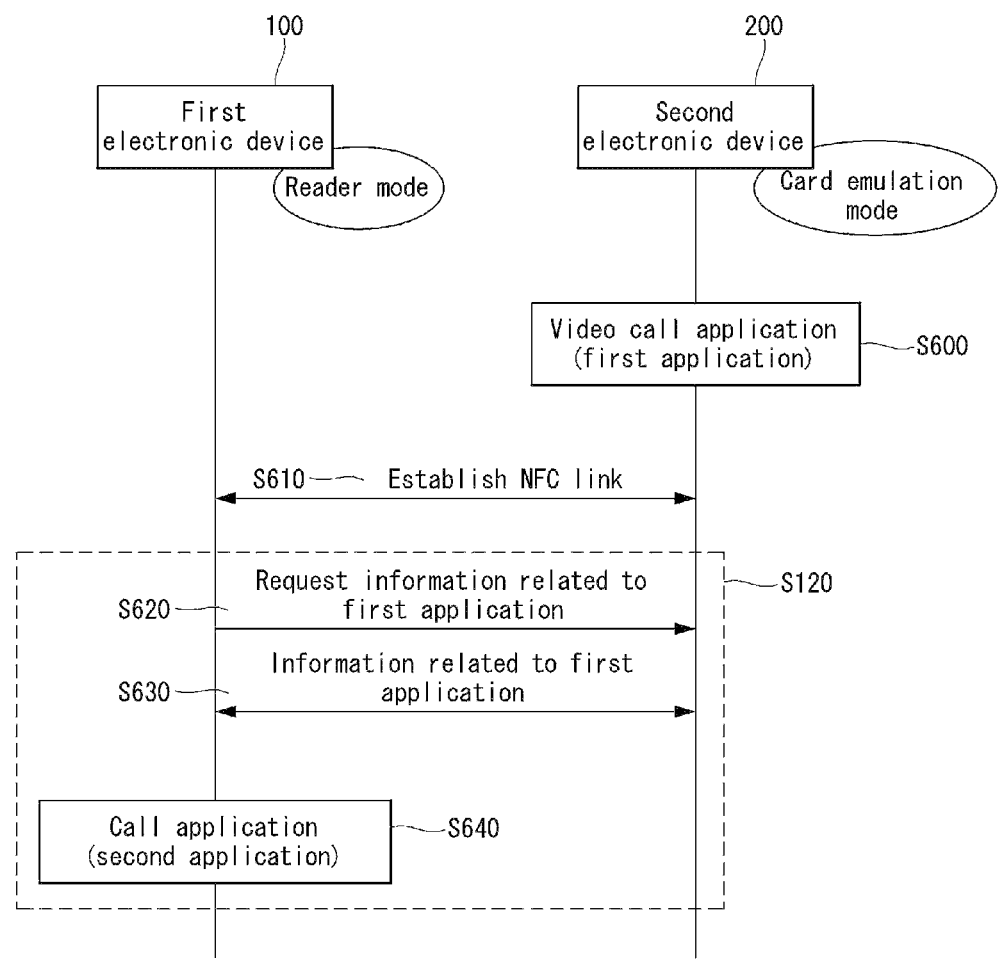
FIG. 13 is a flow chart for explaining a specific example of the method for operating an electronic device with reference to FIG. 6 according to an embodiment of the present invention.

FIG. 13 is a flow chart for explaining a specific example of the method for operating an electronic device with reference to FIG. 6 according to an embodiment of the present invention. The devices illustrated in FIGS. 1 to 5 may perform the method of FIG. 13.

The method for operating an electronic device illustrated in FIG. 13 will be described with reference to FIG. 14. FIG. 14 is a view for explaining a specific example of the method for operating an electronic device according to an embodiment of the present invention.

The method of operating the first and second electronic devices 100 and 200 while the second electronic device 200 is executing a video call application as a first application will now be described with reference to FIG. 13.

With reference to FIG. 13, the method for operating an electronic device according to an embodiment of the present invention may include step S600 of performing a video call application by the second electronic device 200, step S610 of establishing an NFC link between the first and second electronic devices 100 and 200, step S620 of requesting, by the first electronic device 100, information related to the first application being performed by the second electronic device 200 from the second electronic device 200, step S630 of transmitting, by the second electronic device 200, the information related to the first application being performed to the first electronic device 100, and step S640 of executing a call application as a second application by the first electronic device 100. Each of the steps will now be described in detail. In this case, steps corresponding to the foregoing embodiment will be briefly described for the sake of brevity.

The second electronic device 200 performs a video call by executing a first application (e.g., video call application) in step S600.

For example, the second electronic device 200 executes the video call application as the first application of step S100 of FIG. 6. In this case, the user of the second electronic device 200 may hear the voice of a counterpart through an external speaker and inputs the user's voice through the user input unit 240, while viewing an image through a display module 251.

The first electronic device 100 establishes an NFC link with the second electronic device 200 while the second electronic device electronic device 200 is performing the video call in step S610. The first electronic device 100 requests information related to the first application being performed by the second electronic device 200 from the second electronic device 200 through the NFC link in step S620. This is the same as described above, so a detailed description thereof will be omitted.

The second electronic device 200 transmits the information related to the first application requested by the first electronic device 100 to the first electronic device 100 in step S630.

To this end, the second electronic device 200 generates the information related to the first application being performed by the second electronic device 200. As mentioned above, the information related to the first application may include at least one of information indicating the type of the application and supplementary information.

Here, because the second electronic device 200 is currently performing the video call as the first application, the information indicating the type of the application can include information indicating the video call application. The supplementary information may include a handover request message for establishing a substitute communication link between the second electronic device 200 and the first electronic device 100. Details of the handover request message included in the supplementary information will be described in detail later.

The first electronic device 100 executes the call application as a second application in step S640. To this end, the controller 180 of the first electronic device 100 decodes the information related to the first application received from the second electronic device 200 to obtain application type information and supplementary information included in the application related information.

The first electronic device 100 may obtain information indicating that the first application currently being performed by the second electronic device 200 is the video call application through the application type information. In this case, the first electronic device 100 may select and execute a call application as the second application related to the first application.

The call application executed as the second application related to the first application by the first electronic device 100 can distribute the video call function which is performed only by the second electronic device 200 in step S600. Namely, when the call application is performed in the first electronic device 100, a counterpart voice output function performed by the second electronic device 200 may be performed by a receiver of the first electronic device 100. Also, when the call application is performed in the first electronic device 100, the user voice input function performed in the second electronic device 200 may be performed by the user input unit 240 of the first electronic device 100. In this case, the second electronic device 200 is responsive for handling only the video output function.

Whether or not the first electronic device 100 handles only the counterpart voice output function or handles both the counterpart voice output function and the user voice input function may be determined according to a user selection or a pre-set value. Hereinafter, it is assumed that the first electronic device 100 performs the counterpart voice output function and the user voice input function and the second electronic device 200 handles the video output function, for the sake of brevity.

FIG. 14 is a view for explaining a specific example of the method for operating an electronic device according to an embodiment of the present invention.

As shown in FIG. 14(a), in a state in which the user grasps (or holds) the second electronic device 200 to perform the video call, when a call application is performed in the first electronic device, as shown in FIG. 14(b), the user may receive a counterpart voice and input his voice through the first electronic device 100 while viewing an image through the second electronic device 200.

Namely, in the existing video call, because the counterpart voice is output to an external speaker, the user cannot accurately hear the counterpart voice due to external noise. In the present embodiment, because the user can tightly attach the receiver of the first electronic device 100 to his ears to hear the counterpart voice, while viewing the video through the second electronic device 200, the call sensitivity can be enhanced. That is, both the first and second electronic devices 100 and 100 can be used by the user to perform the same video call operation, e.g., the second electronic device 200 for viewing the video of the video call and the first electronic device 100 for listening to the audio of the video call at the same time.

Also, in the conventional video call, in order for the user to perform call communication while viewing the video, the user must input his voice at a certain distance from the input unit. But the voice sensitivity may be degraded and external noise may be introduced as an input. However, in the present embodiment of the present invention, because the user can place the user input unit 140 of the first electronic device 100 close to his mouth and input his voice, an introduction of external noise can be reduced to enhance the call sensitivity.

In order to implement this, the first electronic device 100 may establish a substitute communication link with the second electronic device 200 in executing the call application. The first electronic device 100 may establish the substitute communication link with the second electronic device 200 through a handover request message, supplementary information included in the information related to the application obtained from the second electronic device 200 as discussed above.

The first electronic device 100 then obtains the counterpart voice message being output on the second electronic device 200 through the established substitute communication link.

Also, the first electronic device 100 transmits the user's voice input through the user input unit 140 of the first electronic device 100 to the second electronic device 200 through the substitute communication link. The second electronic device 200 may transcode the user's voice received from the first electronic device 100 as necessary and may transmit the same to the counterpart device.

When the call application is executed in the first electronic device 100, the second electronic device 200 may turn off at least one of the counterpart voice output function and the user voice input function. To this end, when the first electronic device 100 executes the call application toward the second electronic device 200, the first electronic device 100 may inform the second electronic device 200 about the call application. In this case, the first electronic device 100 may transmit information regarding which of the counterpart voice output function and the user voice input function is to be performed through the call application to the second electronic device 200 such that the second electronic device 200 may determine a function to be turned off.

According to the specific example described above with reference to FIGS. 13 and 14, although the user does not request the call application as the second application from the first electronic device 100, the first electronic device 100 automatically selects and executes the call application as the second application, increasing the user convenience. Also, because the user inputs and outputs his voice to and from the first electronic device 100 for a video call, while viewing the video (or image) of the same video call on the second electronic device 200 at the same time, the user can have rich experience in relation to the video call communication. In such a case, optionally, the second electronic device 200 can automatically turn off the audio output while the first electronic device 100 can automatically turn off the video output. Such function control can also be made by the user.

Meanwhile, in the above description, the second electronic device 200 performs the image input/output function and the first electronic device 100 performs the voice input/output function, but the reverse case may be possibly performed. In this case, which of the first and second electronic devices 100 and 200 is to perform the image input/output function and which of the first and second electronic devices 100 and 200 is to perform the voice input/output function may be determined in consideration of the characteristics of the display modules of the first and second electronic devices 100 and 200. For example, an electronic device having a larger display screen among the first and second electronic devices 100 and 200 may perform the image input/output function and an electronic device having a smaller display screen among the first and second electronic devices 100 and 200 may perform the voice input/output function, thus allowing the user to input/output his voice while checking the video (or image) through the larger screen.

The case in which the first application is performed in the second electronic device 200 operating in the card emulation mode has been described in the foregoing embodiments with reference to FIGS. 6 to 14. Alternatively, in the embodiments described above with reference to FIGS. 6 to 14, the first application may also be performed in the first electronic device 100 operating in the reader mode. This will now be described in detail with reference to FIG. 15.

Figure 15:
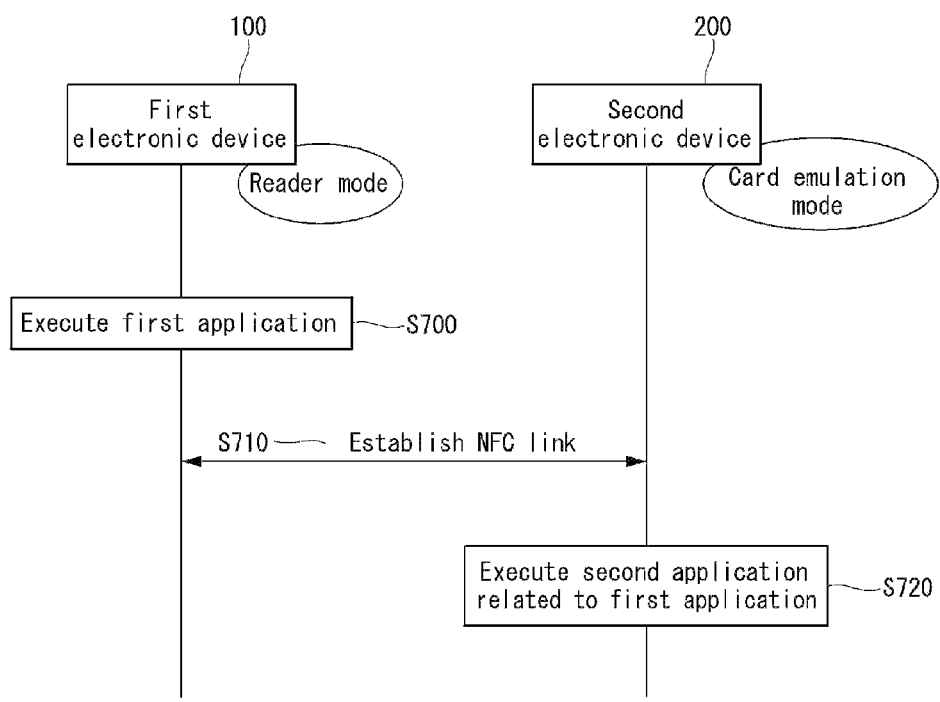
FIG. 15 is a flow chart for explaining a method for operating an electronic device according to another embodiment of the present invention.

FIG. 15 is a flow chart for explaining a method for operating an electronic device according to another embodiment of the present invention. The devices illustrated in FIGS. 1 to 5 may perform the method of FIG. 15.

With reference to FIG. 15, the first electronic device 100 executes a first application in step S700. As afore-mentioned, the first application may include applications such as a content output, a message output, a video, call, or the like.

While performing the first application, the first electronic device 100 establishes an NFC link with the second electronic device 200 (step S710). In this case, the first electronic device 100 executing the first application operates in the reader mode, and the second electronic device 200 operates in the card emulation mode.

The second electronic device 200 executes a second application related to the first application in step S720. To this end, for example the first electronic device 100 transmits information related to the first application to the second electronic device 200 through the established NFC link. The information related to the first application may be called a control signal. The information related to the first application may include at least one of information indicating the type of an application being executed and supplementary information.

Compared with the embodiment illustrated in FIG. 6 in which the first electronic device 100 receives the information related to the application from the second electronic device 200, in the present embodiment, the first electronic device 100 provides information related to the application to the second electronic device 200.

The second electronic device 200 determines and executes a second application related to the first application based on the information related to the application received from the first electronic device 100.

As a matter of course, the embodiments described above with reference to FIGS. 6 to 14 may also be implemented in the embodiment described with reference to FIG. 15. For example, when the first electronic device 100 performs the content application as a first application, the second electronic device 200 may perform the content application as a second application. When the first electronic device 100 performs the message application as a first application, the second electronic device 200 may perform the message reply application as a second application. When the first electronic device 100 performs the video call application as a first application, the second electronic device 200 may perform the call application as a second application.

Thus, in this embodiment, even when the first application is executed in the first electronic device 100 operating in the reader mode, the function corresponding to the case in which the first application is executed in the second electronic device 200 operating in the card emulation mode can be provided likewise as in the embodiments described above with reference to FIGS. 6 to 14.

The various embodiments disclosed in this document may be implemented alone or may be combined to be implemented. Also, the steps constituting each embodiment may be combined with the steps constituting other embodiments so as to be implemented.

In the above description of embodiments of the present invention, when the first application is the content reproduction application, the second application can be also the content reproduction application, but the present invention is not limited thereto and the second application may vary. Also, when the first application is the message application or the video call application, the second application can be the message reply application and the call application, respectively, but, of course, the second application may vary. In this case, when a plurality of second applications is provided, the first electronic device 100 may output a user interface (e.g., display a message or menu on the display module) for allowing the user to select one of the plurality of second applications.

The various embodiments of the present invention may be implemented by one or more computer-readable media. The medium may include a program code, a data file, a data structure, or the like, solely, or a combination thereof in order to implement the embodiments of the present invention. Examples of the medium may include a magnetic medium, an optical recording medium such as a CD and a DVD, and a medium, such as a ROM, a RAM, a flash memory, or the like, configured to store and perform program commands. Examples of the program codes may include a high-grade language code which can be executed by a computer by using an interpreter, or the like, as well as a machine language created by a compiler.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electronic device, comprising:
a near field communication (NFC) module configured to exchange information, via an NFC link, with a different device that is executing a first application; and
a controller operatively connected to the NFC module and configured to:
obtain information related to the first application through the NFC link wherein the information comprises a handover information,
establish a substitute communication link based on the handover information, the substitute communication link being a heterogeneous link from the NFC link,
request content relating the first application through the substitute communication link,
obtain the content through the substitute communication link, and
execute a second application related to the first application based on the obtained content,
wherein the first application is a video call application and the second application is a voice output application,
wherein, when the second application is executed, the different device outputs video of a video call through the video call application,
wherein the controller is configured to perform at least one of a counterpart voice output and a user voice output of the same video call through the call application, and
wherein the controller is configured to turn off a voice output function of the different device when the substitute communication link is established.

2. The electronic device of claim 1, wherein the NFC module is configured to establish the NFC link with the different device when a distance between the NFC module and the different device decreases to be less than a predetermined distance.

3. The electronic device of claim 1, wherein the controller is configured to operate in a reader mode in which electromagnetic waves are radiated by the NFC module to the different electronic device in order to establish the NFC link.

4. The electronic device of claim 1, wherein the first and second applications are content reproduction applications.

5. The electronic device of claim 4, further comprising:
an output unit operatively connected to the controller,
wherein the controller is configured to
output, through the output unit, one or more types of source information with respect to content being output through the content reproduction application of the different device, and
selectively receive a particular source selection from a user based on the source information.

6. The electronic device of claim 1, wherein the controller is configured to perform a handover from the NFC link to another link while the first and second applications are executing.

7. The electronic device of claim 1, wherein the first application is a message application and the second application is a message reply application.

8. The electronic device of claim 7, wherein the message application is one of an SMS (short message service) application, an MMS (multimedia message service) application, an IM (instance message) application, and an e-mail application.

9. The electronic device of claim 7, wherein, when the different device is outputting an original text message through the message application, the controller is configured to transmit a reply message with respect to the original text message through the message reply application.

10. The electronic device of claim 7, further comprising a first display configured to display the original text message, the first display being larger than a second display of the different device.

11. The electronic device of claim 1, wherein the substitute communication link comprises at least one of Bluetooth communication link and Wi-Fi communication link.

12. The electronic device of claim 1, wherein the controller is configured to select a substitute communication link from at least two substitute communication links based on predetermined priority.

13. The electronic device of claim 1, wherein the controller is configured to establish the substitute communication link after the NFC link being terminated.

14. A method for operating a first electronic device, the method comprising:
- establishing a near field communication (NFC) link with a second electronic device, which is executing a first application, through an NFC module of the first electronic device;
- obtaining information related to the first application through the NFC link, wherein the information comprises a handover information;
- establishing a substitute communication link based on the handover information, the substitute communication link being a heterogeneous link from the NFC link;
- requesting content relating the first application through the substitute communication link;
- obtaining the content through the substitute communication link; and
- executing, by the first electronic device, a second application related to the first application based on the obtained content, wherein the first application is a video call application and the second application is a voice output application, wherein, when the second application is executed, the different device outputs video of a video call through the video call application, and wherein the method further comprises:
- performing at least one of a counterpart voice output and a user voice output of the same video call through the call application; and
- turning off a voice output function of the different device when the substitute communication link established.

15. The method of claim 14, wherein the NFC link is established when a distance between the NFC module and the second electronic device decreases to be less than a threshold distance.

16. The method of claim 14,
wherein the first and second applications are content reproduction applications, and
wherein the second application outputs content that is the same as content being output through the first application at a same time.

17. The method of claim 14, wherein the first application is a message application and the second application is a message reply application, or the first application is a video call application and the second application is a call application.

* * * * *